United States Patent [19]
Ali et al.

[11] Patent Number: 4,981,658
[45] Date of Patent: Jan. 1, 1991

[54] PROCESS FOR THE FINE PURIFICATION OF FISSIONABLE MOLYBDENUM

[75] Inventors: Sameth A. H. Ali, Etlingen; Jochen Buerck, Malsch, both of Fed. Rep. of Germany

[73] Assignee: Kernforschungezentrum Karlsruhe GmbH, Karlsruhe, Fed. Rep. of Germany

[21] Appl. No.: 349,185

[22] Filed: May 9, 1989

Related U.S. Application Data

[63] Continuation of Ser. No. 49,500, May 14, 1987, abandoned.

[30] Foreign Application Priority Data

May 15, 1986 [DE] Fed. Rep. of Germany ....... 3616391
Feb. 31, 1987 [EP] European Pat. Off. ........... 87102017

[51] Int. Cl.[5] ............ C01G 39/02
[52] U.S. Cl. ............ 423/2; 423/53; 423/59; 23/294 R
[58] Field of Search ............ 423/2, 53, 59; 23/294 R

[56] References Cited

U.S. PATENT DOCUMENTS

| | | | |
|---|---|---|---|
| 3,799,883 | 3/1974 | Arino et al. | 423/2 |
| 3,830,746 | 8/1974 | Brown et al. | 423/2 |
| 3,970,583 | 7/1976 | Panek-Finda | 423/2 X |
| 4,017,583 | 7/1977 | Motojima et al. | 423/2 |
| 4,094,953 | 6/1978 | Hadi et al. | 423/2 |
| 4,123,498 | 10/1978 | Rosenbaum et al. | 423/2 |

OTHER PUBLICATIONS

"Inorganic Ion Exchangers and Adsrobents for Chemical Processing in the Nuclear Fuel Cycle", Int'l Atomic Energy Agency Committee Meeting, Vienna, Jun. 12-15, 1984, IAEA-Tec Doc-337, 1985.

J. Bürch, Dissertation Universität (tH) Karlsruhe, Institut Für Radiochemie, KfK 4095, Aug. 1986.

J. Bürch, S. Ali, H. Ache, Institut für Radiochemie, Kernforschungszentrium Karlsruhe, KfK 3754, Aug. 1984.

Ali et al., "Separation and Purification of Fission Products From Process Streams of Irradiated Nuclear Fuel", Technical Committee Meeting on Ion Exchanges and Absrobents for Chemical Processing in the Nuclear Fuel Cycle, Vienna, Austria, Jun. 12-15, 1984, IAEA TC/518-11.

*Primary Examiner*—Edward A. Miller
*Assistant Examiner*—Ngoclan T. Mai
*Attorney, Agent, or Firm*—Sughrue, Mion, Zinn, Macpeak & Seas

[57] ABSTRACT

Process for the fine purification of fission molybdenum, dissolved in ionic form together with ions of the fission products of I, Sn, Ce, Ru and Zr in aqueous mineral acid solution, in which the fission molybdenum is fixed by a metal oxide in a sorption step and is then released in a dèsorption step, comprising: (a) passing the aqueous solution over an amphoteric oxide to sorb the ions of Mo, I, Ce, Ru, Sn and Zr, (b) drying the resulting charged oxide and thereafter heating the dried oxide to a temperature of about 1200° C. to about 1300° C. to sublimate the Mo, and at the same time passing a carrier stream containing water vapor and oxygen over the charged oxide to take up the Mo, and (c) desublimating Mo out of the carrier gas stream by cooling to a temperature below 600° C., and followed by further cooling to room temperature, dissolving the resulting Mo residue in an aqueous solution of a strong alkali to form a molybdate solution.

1 Claim, 4 Drawing Sheets

PROCESS FOR THE FINE PURIFICATION OF FISSIONABLE MOLYBDENUM

This is a continuation of U.S. patent application Ser. No. 049,500, filed May 14, 1987, now abandoned.

BACKGROUND OF THE INVENTION

The present invention relates to a process for the fine purification of fission molybdenum, dissolved in ionic form together with ions of the fission products of I, Sn, Ce, Ru and Zr in a solution of aqueous mineral acid, in which the fission molybdenum first is fixed by a metal oxide in a sorption step, and is then released in a desorption step.

Because of its characteristics, the radioactive, relatively short-lived nuclide technetium-99m is used in nuclear medicine. In doing this, it is separated out from the mother nuclide/daughter nuclide balance as the daughter of molybdenum-99 in as short a time as possible before it is used. The production of the mother nuclide Mo-99 is known. For example, from a uranium alloy of the approximate composition $UAl_3$ which, because of the often varying proportion of aluminum, is most often labelled with $UAl_x$, after a five- to ten-day neutron irradiation in a nuclear reactor under forced flow cooling and after a subsequent cooling-off period for the $UAl_3$ target lasting about one day, the Mo-99 is recovered following a series of chemical process steps. In the course of this activity, the target discs are, for example, dissolved in a three to six-molar sodium hydroxide solution, where the result, apart from the alkaline solution, is a solid residue and waste gas In the waste gas, apart from hydrogen and nitrogen carrier gas, among others, Xe-133, Xe-135, Kr 85 and I-131 are present. In the solid residue are found $UO_2$ and $NaU_2O_7$. The solution contains aluminum ions and fission product ions, such as, e g., ions of alkali and alkaline earth metals, as well as iodine, tin and molybdenum and smaller amounts of ions of elements which are of low solubility such as cerium, ruthenium and zirconium. The alkaline solution separated from the residue is then subjected to several sorption, wash and elution steps, where at the present time different organic ion exchangers find use as sorption agents. By means of this process, the molybdenum-99 is to a large extent decontaminated of the fission product ions and other dissolved ions which were present. As, however, an important prerequisite for the use of the molybdenum end product and its daughter nuclide technetium-99m is its purity, further purification steps are required.

The further purification, termed as a fine purification was, for example, carried out up to now as follows: The alkaline solution obtained by means of elution of the last organic ion exchanger was acidified with mineral acid to a pH of about 2. The resulting acidified solution then was passed over an acidic aluminum oxide for the sorption of the molybdenum-99. The resulting charged $Al_2O3$ was washed and finally eluted with an ammonia solution. About 2 to 3 liters of the ammonia elution solution was vaporized to obtain about 2 to 3 ml of a concentrated solution. The concentrated solution was transferred over into a platinum crucible and in it evaporated to dryness, the crucible was then transferred into a volatilization apparatus and finally heated to a temperature of up to about 600° C. in order to fully drive out all ammonia salts and organic residue and/or impurities, for example, from the organic ion exchangers, and from hoses and valves made of synthetic materials. The residue from the above volatilization step was then heated to a high temperature of about 900° to 1000° C. to bring about molybdenum sublimation from the platinum crucible. The resulting $^{99}$Mo-oxide then was desublimated outside of the heating zone, and thereafter desublimated $^{99}$Mo-oxide was dissolved with sodium hydroxide after it had cooled.

This method belonging to the state of the art is complicated and time-consuming. Moreover, as the process must be carried out under stringent protective measures against radiation, including employment of remote control techniques, there emerged manipulation-intensive process steps over and above the time-robbing vaporization step, in which one can never entirely exclude the risk that a foaming-over may occur.

SUMMARY OF THE INVENTION

It is an object of the present invention to provide a process for the fine purification of molybdenum (fission molybdenum) which, under difficult operational conditions, can be extensively carried out in a secure manner, not susceptible to breakdowns and at a cost that is lower in terms of operational time, operational equipment and handling technique, and which delivers at the same time a highly pure Mo-99 product at decreased volumes of radioactive waste.

Additional objects and advantages of the present invention will be set forth in part in the description which follows and in 5 part will be obvious from the description or can be learned from practice of the invention. The objects and advantages are achieved by means of the processes, instrumentalities and combinations particularly pointed out in the appended claims.

To achieve the foregoing objects and in accordance with its purpose, the present invention provides a process for the fine purification of fission molybdenum, dissolved in ionic form together with ions of the fission products of I, Sn, Ce, Ru and Zr in an aqueous mineral acid solution, in which the fission molybdenum is fixed by a metal oxide in a sorption step and is then released in a desorption step, comprising: (a) passing the aqueous solution over an amphoteric oxide to sorb the ions of molybdenum, I, Ce, Ru, Sn and Zr, (b) drying the resulting charged oxide, and thereafter heating the dried oxide to a temperature of about 1200° C. to about 1300° C. to form a molybdenum containing oxide and to bring about sublimation of the so-formed molybdenum containing oxide while at the same time passing a carrier gas stream containing water vapor over the charged oxide to take up the sublimated molybdenum containing oxide (c) desublimating the molybdenum containing oxide out of the carrier gas stream by cooling to a temperature below 600° C., and following further cooling to room temperature, dissolving the resulting molybdenum containing oxide residue in an aqueous solution of a strong alkali to form a molybdate solution.

Preferably, the amphoteric oxide is selected from $SnO_2$, $\alpha$-$Al_2O_3$ or $ZrO_2$. It is also preferred that aside from water vapor, the carrier gas stream contains oxygen.

In another aspect of the present invention, there is provided a process for the fine purification of fission molybdenum, dissolved in ionic form together with ions of the fission products of I, Sn, Ce, Ru and Zr in aqueous mineral acid solution, in which the fission molybdenum is fixed by a metal oxide in a sorption step and is then released in a desorption step comprising: (a) passing the aqueous solution over $SnO_2$ to sorb the ions of molybedenum, I, Ce, Ru, Sn and Zr, b) drying the resulting charged $SnO_2$, and thereafter heating the dried $SnO_2$ to a temperature of about 1200° C. to about 1300° C. to form a molybdenum containing oxide and bring about sublimation of the so-formed molybdenum containing oxide and at the same time passing a carrier gas stream containing oxygen over the charged oxide to take up the sublimated molybdenum containing oxide, (c) desublimating the molybdenum containing oxide from the carrier gas stream by cooling to a temperature below 600° C. and following further cooling to room temperature, dissolving the resulting molybdenum containing oxide residue in an aqueous solution of a strong alkali to form a molybdate solution.

In the feed solution molybdenum exists in form of the ions $Mo_7O_{24}^{-6}$ and $Mo_8O_{26}^{-4}$ (in a minor amount) and, in a solution with a $HNO_3$ concentration of 1 mol/l or higher in form of $MoO_2^{+2}$. All these ions were adsorbed on the sorption agents. In the sublimation and desublimation steps molybdenum is only in the form of Mo-oxide or Mo-oxide-hydroxide.

The other fission nuclides present in the feed solution in the form of:

iodide (for iodine), nitrate anions or nitrosylnitrate anions (for Sn, Ce, Ru and Zr; there are a great number of possible existing species of such anions).

The range for suitable cooling temperatures in step (c) can be from above 100° C. to below 600° C. The dissolving step can be carried out with an aqueous solution of NaOH or $NH_4OH$ with concentrations of more than 0.1 mol/1.

The present invention also provides an apparatus for carrying out the desorption step, comprising: a heatable first chamber for holding the charged amphoteric metal oxide and sublimating the molybdenum containing oxide, a second chamber connected to the first chamber for taking up the sublimate and desublimating the molybdenum containing oxide, a gas input feed connected to the first chamber, a gas exhaust output connected to the second chamber, a first gas-permeable membrane or frit or a crucible with a perforated bottom between the gas input feed and first chamber to separate the first chamber from the gas input feed, a second gas-permeable membrane or frit between the first chamber and the second chamber to separate these chambers from each other, and a heater for heating the first chamber.

Preferably, the heater is designed as an inductive heating device with a graphite layer facing the first chamber.

The second chamber preferably is provided with quartz filling bodies.

Preferably, the portion of the apparatus which comprises the second chamber, the second gas-permeable membrane or frit and the gas exhaust output is designed so that it can be removed from the rest of the apparatus.

It is to be understood that both the foregoing general description and the following detailed description are exemplary and explanatory, but are not restrictive of the invention.

DETAILED DESCRIPTION OF THE INVENTION

Figure 1:
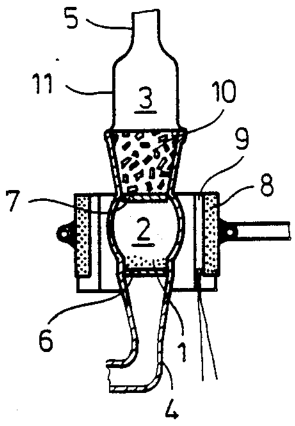
FIG. 1 and 1*a* are schematic representations of one embodiment of an apparatus according to the present invention.

A system and a process for the fine purification of fission molybdenum, in which Mo-99 is adsorbed by $Al_2O_3$ and partially separated out from other fission product ions, was described in Nuclear Energy 28 (1985), Issue 8, pages 352 through 354, and which is carried out by the following process steps: a) concentrating a 20 1 alkaline ammonia eluate of Mo-99 to 400 ml, (b) setting this raw concentrate at 0.1 M $HNO_3$, (c) passing the acidified solution over acidic $Al_2O_3$, d) eluting the Mo-99 from the $Al_2O_3$, (e) acidifying the eluate and dividing it among quartz-glass flasks, (f) vaporizing the solution in the quartz-glass flasks to dryness according to the rotation vaporization principle, (g) heating the flasks in a high temperature oven to 1000° C. to sublimate the resulting Mo-99 oxide, and (h) after cooling, dissolving the sublimate in diluted sodium hydroxide.

Each sublimation flask is supplied with a carrier amount of inactive molybdate in the form of $(NH_4)_6Mo_7O_{24}$ for more complete sublimation of the Mo-99, which is not supposed to exceed 40 mg of Mo (total amount of inactive Mo plus Mo-99 calculated as the element) per sublimation flask. Other amounts of carrier substance are not described. The cited publication mentions the fact that a direct sublimation of Mo-99 activity from the $Al_2O_3$ is not possible.

It has now been determined that the sorption of molybdenum-99 ions from an aqueous solution containing molybdenum and other fission products by amphoteric metal oxides in the fine purification process according to the present invention can take place fully independently of pH by $Al_2O_3$ from solutions pH of 0.5 through pH 8, or by $SnO_2$ from solutions having a pH of 0 through about pH 4.

The process according to the present invention provides a number of other advantages. For example, the addition of inactive carrier molybdate to the acidified starting solution before the sorption by the amphoteric oxide can be restricted to 2 to 3 mg Mo (calculated as the element) per gram of the amphoteric metal oxide to be used. In this manner, a higher specific activity (Ci/g) is achieved on the sorption agent. Further, the direct sublimation of the Mo-99 oxide from the sorption agent considerably shortens the operational period, as compared to an elution of the $Al_2O_3$ column with aqueous ammonia solution, vaporization of the eluate and sublimation of the Mo-99 oxide from the dry residue. In addition, in the present invention, there is a simplification of the handling technique, which brings along with it security and time-savings alike. Further, in the present invention, the decontamination of the end product guarantees a good quality, even in the event that breakdowns or disruptions arise. Moreover, in the present invention, in the event that impurities penetrate through the last organic ion exchanger column, a satisfactory decontamination of the Mo-99 and a satisfactory quality of the end product still is assured.

In what follows, the process according to the present invention, in light of exemplary sorption and desorption tests with different amphoteric metal oxides and with aqueous, Mo-99-indicator—containing simulate solutions of non-radioactive carrier ions of the species that are present in the actual acidified eluate of the last organic ion exchanger, is described in greater detail and the results illustrated with the drawings.

It should be noted that one would expect that the application of the process of the present invention to actual eluates in the radioactive operations would bring about an improvement of the fine purification of Mo-99 and/or an increase in the decontamination factors with respect to the contaminating fission nuclides as compared to the decontamination factors which were achieved in the experiments described below.

The concentration of the elements examined in the sorption and desorption experiments corresponded to such molarities ($10^{-5}$ $10^{-3}$ Mol/1) of fission products as appear in the known fission molybdenum-99 separation process, if, on the basis of process disruptions in the preceding organic ion exchanger separation steps (pre-purification), a complete activity penetration were to occur prior to the final fine purification measures of the process according to the present invention With regard to the fine Mo-decontamination by means of the process of the present invention, the most unfavorable conditions, in terms of the presence of other fission products, were selected. In the process solutions (after the last column with organic ion exchanger) accruing during routine operations, the ratio of molybdenum to the other relevant partially ionic elements present, such as Ru, Sn, and Zr, is significantly more favorable by means of the depletion of these elements in the organic ion exchanger main purification stages of pre-purification. The experiments which are described below, moreover, were conducted separately for each element, so that in the event of a fission product mixture the co-sorption of the fission product species, charged at only a low level with respect to the highly charged $Mo_7O_{24}^{-6}$ anions, were permitted to be forced further back. As a result, decontamination factors far and away higher than those achieved in the following experiments are possible.

The retention of the elements cerium and iodine by the metal oxides lay in the framework of the statistical margin of error for activity measurements (comparison of the impulse rates of the solution"s aliquot number pipetted out before and after the sorption). so that the portion possibly absorbed must be looked upon as negligible. In this way, the decontamination factors for Ce and I for the sorption step are already very much greater than 100. On the basis of these findings, desorption experiments for these two elements were no longer able to be carried out.

Not just nitrogen charged with $H_2O$. or oxygen charged with $H_2O$ are usable as carrier gas, but also other gas mixtures containing $H_2O$, such as air, noble gases with or without $O_2$. etc., for example. The ranges for the addition of $H_2O$ or $O_2$ to the carrier gas are 0.1 to 40 g/h and 0.1 to 40 1/h respectively. The amount of carrier gas ranges between 0.1 and 40 1/h.

EXAMPLE 1

For molybdenum retention by $Al_2O_3$ $SnO_2$ and $ZrO_2$, an inactive molybdate solution, which contained nitric acid and had a molybdenum concentration of $1.77\times10^{-3}$ Mol/1, was studied at different feed-loadings (mg Mo/g sorption agent oxide and/or exchanger).

Figure 3:
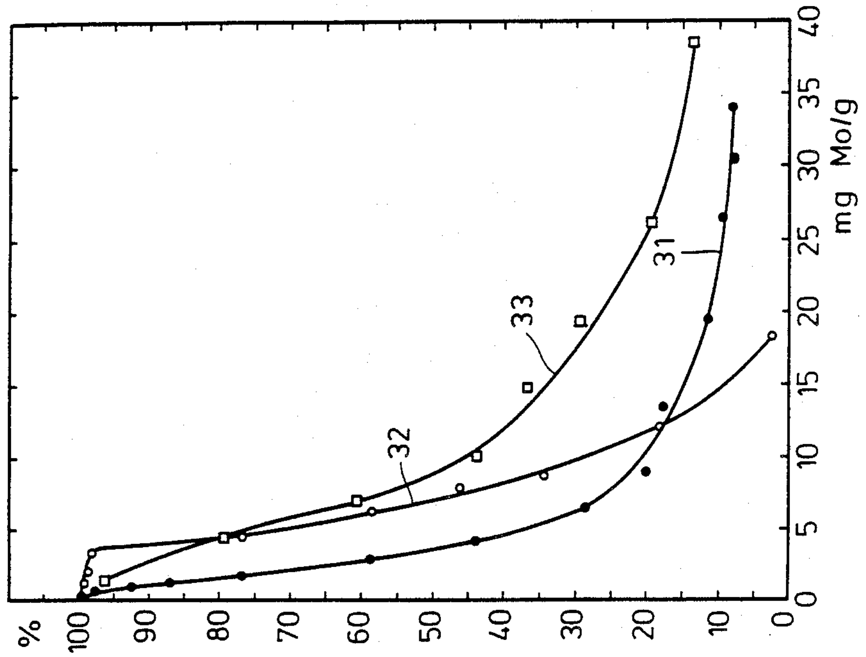
FIGS. 2 to 7 show graphs of results obtained by following the process of the present invention with simulated feed solutions.
Figure 2:
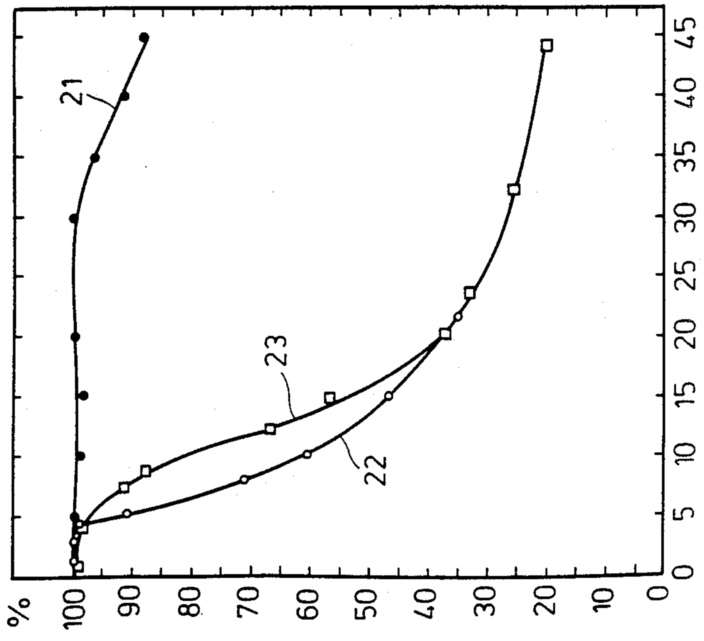

The results are shown in FIGS. 2 and 3.

FIG. 2 shows the Mo-retention from 0.02 M $HNO_3$ solutions, where Curve 21 stands for the sorption on $Al_2O_3$, Curve 22 for the sorption on $SnO_2$, and Curve 23 for the sorption on $ZrO_2$.

The curve values for FIG. 3 were obtained from 1 M $HNO_3$. Curve 31 shows the Mo-retention on acidic $Al_2O_3$, Curve 32 on $SnO_2$ and Curve 33 on $ZrO_2$.

From these results, it can be seen from Curve 21 that an Mo-sorption from weakly acidic solutions by $Al_2O_3$ is achieved up to a feed-loading of about 30 mg Mo/g of exchanger. Indeed, when employing $SnO_2$, a feed-loading of only about 4 mg Mo/g of exchanger is obtainable as shown in Curve 22 in FIG. 2, but this loading can be obtained up to a high acid strength of the aqueous solution, as can be seen from Curve 32 in FIG. 3. Important is a retention of Mo on the sorption agent as high as possible within a range of acidity of the Mo containing solution as broad as possible. The Mo retention by $ZrO_2$, shown in Curve 23, is comparable with that of $SnO_2$, namely, about 4 mg Mo/g of $ZrO_2$ penetration capacity.

As can be seen from Curve 33, which shows the Mo retention by $ZrO_2$ from 1 M $HNO_3$ solution, the sorption on $ZrO_2$ is reduced at a higher acid strength of the feed solution, as has also already been determined with the other oxides. The loss of capacity of the $ZrO_2$ is somewhat greater than in the case of the $SnO_2$ . but far and away smaller than in the $Al_2O_3$ system. Consequently, in terms of its sorption behavior, $ZrO_2$ is comparable to the $SnO_2$.

EXAMPLE 2

Figure 4:
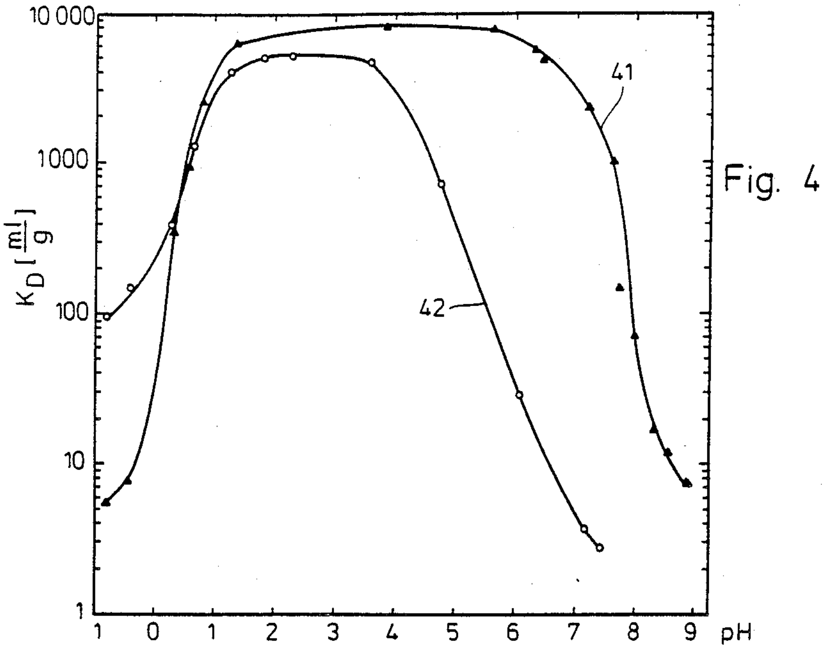

The Mo distribution coefficients of $Al_2O_3$ and $SnO_2$, as a function of the pH value of the feed solution, which possessed a molybdenum concentration of $2.2\times10^{-3}$ Mol/1, were examined at an Mo feed-loading of 3 mg/g of exchanger during a contact period of 20 hours. In FIG. 4, the individual results are shown for the distribution coefficients $K_D$ (ml/g) on Curve 41 for $Al_2O_3$, and on Curve 42 for $SnO_2$. The extensive pH value independence of the two exchanger types and/or sorption agents emerged clearly under the conditions given.

EXAMPLE 3

This example shows a direct molybdenum oxide sublimation from a charged metal oxide exchanger and/or sorption agent.

Figure 1A:
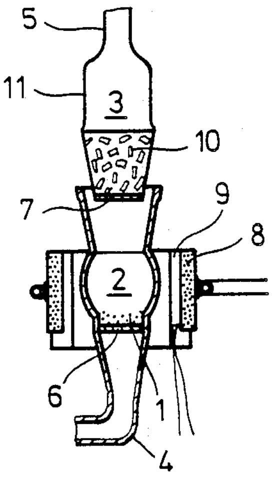

Metal oxide exchanger particles charged with molybdate anions were fed into a sublimation apparatus constructed according to FIG. 1. As shown in FIG. 1, a sublimation chamber 2 is connected to a carrier gas supply input and is separated from it by a gas permeable quartz frit 6. All around the outside of chamber 2, there is an induction heater 8. (The generator for heater 8 is not shown in FIG. 1.) A graphite ring 9 which encloses chamber 2 is arranged on the interior of induction heater 8. In this manner the temperature in sublimation chamber 2 can be raised to the desired high 5 temperatures, such as, for example, to 1200° to 1300° C. Sublimation chamber 2 faces a desublimation chamber 3 where the desublimation of the Mo-oxide takes place, and is separated from chamber 3 by means of a quartz frit 7. Desublimation chamber 3 has quartz filling bodies 10 which facilitate the desublimation. For an easier dissolution of the Mo-oxide desublimated in chamber 3, part 11 of the device, which holds desublimation chamber 3, quartz frit 7 and gas discharge pipe 5, is designed to be removable from the rest of the apparatus, (as shown in FIG. 1*a*). During the sublimation step the upper part 11 is tightly connected with the lower part of the apparatus.

In lieu of quartz frit 6, an insert, made, for example, out of Pt crucible with a bored through or perforated bottom, covered with e.g. quartz wool, which supports the charged metal oxide, can also be used to separate the chamber 2 from the carrier gas supply input 4 while conducting the sublimation of the Mo-99 oxide. Heater 8 is not restricted to inductive heating, but rather other useful heating devices having an effect on chamber 2 from the outside can be employed.

Figure 5:
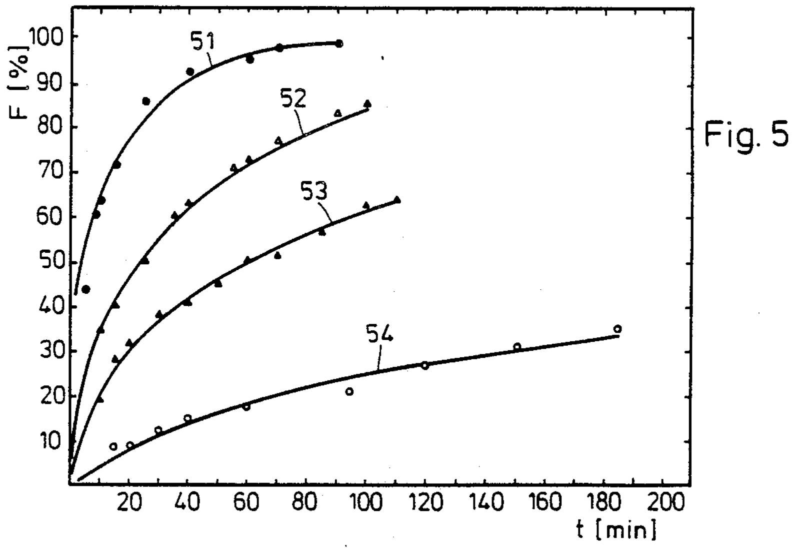
Figure 6:
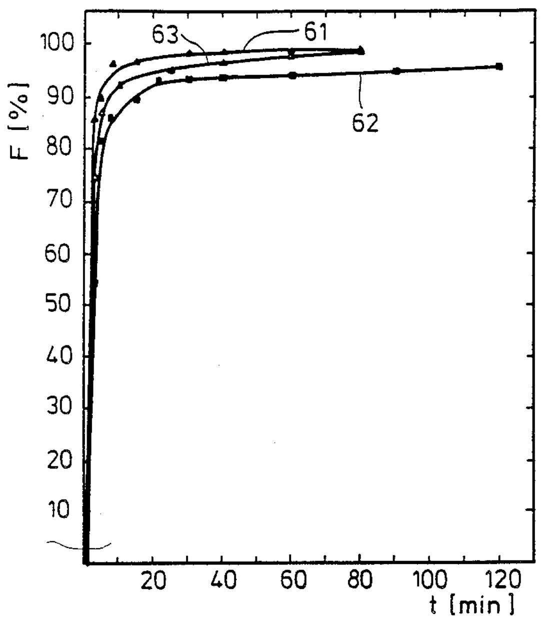

In the apparatus described, the molybdenum oxide sublimation from charged metal oxide exchangers was studied as a function of the sublimation time at different temperatures The charge of the metal oxide exchangers amounted to 4.7 mg Mo/g of exchanger The results are shown in FIGS. 5 and 6.

FIG. 5 shows molybdenum sublimation yields (amounts of desorbed Mo) F in percentages of the original charge, from $Al_2O_3$ at temperatures of 1250° C. (Curve 51), 1150° C. (Curve 52), 1075° C. (Curve 53) and 960° C. (Curve 54), with a carrier gas $N_2/H_2O$ at a flow-through rate of 33.1/hour at 32 g $H_2O$/hour. As can be seen from FIG. 5, within a sublimation period of about 90 minutes, satisfactory results (90% Mo sublimation or more) can only be attained at 1250° C.

FIG. 6 shows that molybdenum sublimation yields F having high values of over 90% are already attainable from a charged $SnO_2$ exchanger in a sublimation period of about 30 minutes. In particular, Curve 62 shows the yields which are obtained with a carrier gas of $N_2/H_2O$ having a gas throughput and a water content which are the same as described above for the carrier gas employed to obtain the curves of FIG. 5. The yields in Curve 62 are even surpassed by the yields shown in Curve 61, which were obtained with a carrier gas stream of oxygen and water having the same throughput and water content as the $N_2/H_2O$ carrier gas.

Figure 7:
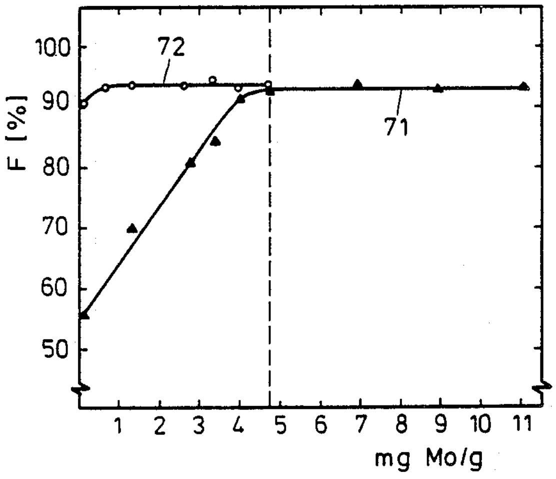

Curve 63 shows Mo-sublimation yields which were obtained from charged $SnO_2$ with an oxygen-containing carrier gas which did not contain any $H_2O$. As can be seen in Curve 63, the yields are between the yields shown in Curves 61 and 62 for sublimation periods up to 80 minutes, but the yields achieved a value of 98% with sublimation periods of 80 minutes or more FIG. 7 shows the dependence of the molybdenum sublimation yield from $Al_2O_3$ and/or $SnO_2$ exchangers as a function of the molybdenum charging at 1250° C., at a sublimation period of 40 minutes using a carrier gas of $N_2/H_2O$ at 33.3 l/hour and 32 g $H_2O$/hour. While from $Al_2O_3$ a more than 90% yield is obtainable only from a charge of 4.7 mg Mo/g of exchanger or more as can be seen from Curve 71, from $SnO_2$ a yield at the same level is attainable for the charge area of 0.5 mg/of exchanger to 4.7 Mo/g of exchanger as shown in Curve 72.

The retention behaviour of fission nuclides I, Sn, Ce, Ru, Zr from 0.02 M to 1 M nitric acid solutions on $SnO_2$ was studied using separate solutions of each fission nuclide alone as a feed solution.

The concentrations of the fission nuclides in their feed solutions were as follows:

$4.7\times10^{-4}$ *mol/l for each Ce and Zr*

$1.4\times10^{-5}$ *mol/l for Ru*

$4.6\times10^{-5}$ *mol/l for each I and Sn.*

Then the thermal sublimation yields of the sorbed fission products were ascertained under conditions of the process of the invention.

The loading concentrations on $SnO_2$ were:

$8.4\times10^{-6}$ *mol Sn or Ce or Zr/g $SnO_2$ and*

$5\times10^{-8}$ *mol Ru/g $SnO_2$.*

$5\times10^{-8}$ *mol Ru/g $SnO_2$.*

I was practically not adsorbed.

In obtaining a precise analytical detection of the sorption and desorption (sublimation) events during the process examinations with feed solutions containing Mo and a mixture of said other fission products were not carried out.

The decontamination factors of the fission products Ru, Sn and Zr, in terms of Mo, in the $SnO_2$ system are as follows:

After 30 minutes of sublimation time at 1250° C.—for Ru: about 40; for Sn: greater than 100: and for Zr: greater than 100.

In the described sublimation apparatus according to FIG. 1, the molybdenum desorption behavior from $ZrO_2$, which was charged with 4.7 mg Mo/g, was ascertained. The following table shows some percentage volatility yields at 1250° C. with an $N_2/H_2O$ carrier atmosphere and an $O_2/H_2O$ carrier atmosphere:

| | 30 Minute Sublimation Period | 60 Minute Sublimation Period |
|---|---|---|
| $N_2/H_2O$ Atmosphere | 89.4% | 91.4% |
| $O_2/H_2O$ Atmosphere | 87.7% | 90.65% |

The yield values obtained from these individual measurements are comparable to the values obtained in the $Al_2O_3$ system under the identical sublimation parameters. At a smaller Mo charge of 0.5 mg Mo/g of $ZrO_2$, there resulted, with an $O_2/H_2O$ carrier gas at 1250° C. a diminution of the sublimation yield to only 60.2% after 30 minutes of sublimation time in a manner similar to the diminution which occurs when using a smaller Mo charge with $Al_2O_3$.

It will be understood that the above description of the present invention is susceptible to various modifications, changes and adaptations, and the same are intended to be comprehended within the meaning and range of equivalents of the appended claims.

What is claimed is:

1. Process for the fine purification of fission molybdenum, dissolved in ionic form together with ions of the fission products of I, Sn, Ce, Ru and Zr in an aqueous mineral acid solution, comprising:

(a) providing as the aqueous mineral acid solution a solution which has a pH of 0 to about 4, and passing the aqueous mineral acid solution over $SnO_2$ to sorb the ions of molybdenum, I, Ce, Ru, Sn and Zr onto the $SnO_2$, (b) drying the resulting charged $SnO_2$ and thereafter heating the dried $SnO_2$ to a temperature of about 1200° C. to about 1300° C. for a period of ≦+ to form a molybdenum containing oxide and to sublimate the so-formed molybdenum containing oxide, and at the same time passing a carrier gas stream containing water vapor and oxygen over the charged $SnO_2$ to take up the sublimated molybdenum containing oxide, desublimating the molybdenum containing oxide out of the carrier gas stream by cooling to a temperature below 600° C., and following further cooling of the desublimated molybdenum containing oxide to room temperature, dissolving the resulting molybdenum containing oxide residue in an aqueous solution of a strong alkali to form a molybdate solution.

* * * * *